United States Patent [19]

Reynolds et al.

[11] 4,445,382

[45] May 1, 1984

[54] DIFFERENTIAL PRESSURE-RESPONSIVE DEVICE

[75] Inventors: Louis E. Reynolds, Richardson; Michael D. Beall, Garland, both of Tex.

[73] Assignee: Reynolds Equipment Company, Garland, Tex.

[21] Appl. No.: 314,215

[22] Filed: Oct. 23, 1981

[51] Int. Cl.³ ............................................. G01L 13/02
[52] U.S. Cl. ...................................... 73/716; 73/729
[58] Field of Search ................. 73/716, 717, 718, 719, 73/720, 721, 722, 707, 729

[56] References Cited

U.S. PATENT DOCUMENTS

| | | | |
|---|---|---|---|
| 2,489,123 | 11/1949 | Dickey | 73/729 |
| 3,323,369 | 6/1967 | Kallenbach | 73/716 |
| 3,422,680 | 1/1969 | Nolte | 73/716 |
| 3,718,048 | 2/1973 | Nolte | 73/716 |

Primary Examiner—Donald O. Woodiel
Attorney, Agent, or Firm—Kanz, Scherback & Timmons

[57] ABSTRACT

A differential pressure-responsive apparatus is disclosed which includes a primary base plate member, a cover member removably attached to the primary base plate and thereby forming a normally closed chamber, a bellows and range spring module removably attached to the primary base plate within the chamber and including a secondary base plate member, a bellows apparatus with one end thereof removably fixed to the secondary base plate and having an opposite normally closed movable end thereof movable in response to varying differential pressure thereacross, said bellows apparatus dividing the chamber into separate inner and outer chamber portions, and a first, normally closed, one-way opening valve in the normally closed movable end of the bellows apparatus, operable for interconnecting and disconnecting the inner and outer chamber portions of the apparatus with the first valve interconnecting the inner and outer chamber portions when the differential pressure therebetween exceeds a predetermined value in a first direction. A second, normally closed, one-way opening valve is located in the normally closed movable end of the bellows apparatus and is operable for interconnecting the inner and outer chamber portions when the differential pressure therebetween exceeds a predetermined value in a second direction.

12 Claims, 3 Drawing Figures

DIFFERENTIAL PRESSURE-RESPONSIVE DEVICE

BACKGROUND OF THE INVENTION

The present invention relates in general to bellows types of differential pressure measuring devices such as employed in connection with fluid-flow meters and recorders, and more particularly to new and useful improvements thereto for increased ease of manufacture and field maintenance of the devices as well as increased reliability in the operation thereof.

As is well known in the art, differential pressures derived from orifices, venturi tubes and like apparatus, may be employed to determine the rate of flow of fluids through conduits. Also, differential pressures may be employed to determine the level of fluids within closed tanks, as well as pressure drop or pressure increase across fluid-handling apparatus such as filters, scrubbers, pumps or compressors. Of the many known types of apparatus for differential pressure measurement, or for actuation of measurement devices in response to differential pressures, such as for example, mercurial or water manometers and elastic metallic membranes or diaphrams, those based on the principal of the deflection of a single, elastic metal bellows across which the differential pressures to be sensed are directly applied have been found to offer the greatest advantages in structural simplicity and operational sensitivity and accuracy. To provide a permanent record, the measured pressure differential is converted to a readout on a recording chart through suitable linkage mechanisms.

One environment in which apparatus for differential pressure measurements is used is in the natural gas industry where the flow of natural gas from the natural gas wells and fields needs to be accurately and dependably measured and recorded, especially in view of the economic considerations involved because of the increased cost of natural gas. For measurement of the gas flow through any particular pipe or pipeline, a differential pressure-responsive device or meter is connected across a primary device (venturi, orifice plate or flow tube) operatively located in or with respect to the pipeline. For recording or indicating functions, the mechanical output of the differential pressure-responsive device is connected to a recorder, indicator or other readout instrument. For controlling functions, the output of the differential pressure-responsive device is connected to a switch, transmitter or other control device to control the flow of gas through the pipeline.

U.S. Pat. No. 3,422,680, commonly assigned, which issued on Jan. 21, 1969 and which is herein incorporated by reference, discloses a single, elastic metal bellows type of differential pressure-responsive device. Although the device disclosed in U.S. Pat. No. 3,422,680 operates satisfactorily, there are areas open for improvement relative to ease of field maintenance and manufacture and assembly together with improved reliability.

Gas companies are concerned about obtaining an accurate and dependable reading of the amount of gas flowing so the recipient of the gas may be properly billed. Normally the gas continues to flow even though the differential pressure-responsive device may be providing an incorrect indication. Gas companies normally require that the differential pressure-responsive devices or meters be checked and inspected in accordance with a predetermined schedule. For mounting purposes, the prior art differential pressure-responsive devices are usually configured with a downwardly facing cylindrical socket (located on the lower portion of the unit) for a telescopic coupling connection to the upper end of a suitable meter supporting columnar member. The differential pressure-responsive device or meter is connected across the primary device (venturi, orfice plate or flow tube) by a high pressure connection pipe and a low pressure connection pipe. In order to check and inspect the internal parts or elements of the differential pressure-responsive device for dirt, trash and malfunctioning parts and also to clean the internal portions and further to replace internal parts, the prior art devices must be disconnected from the high pressure pipe, the low pressure pipe and the supporting column member and then be essentially completely disassembled in order to obtain access to the internal cavities and parts or elements of the device. Then, of course, the place the device back in service and on the line, the reverse of the above-listed procedure must be performed. While the device is off the line and out of service, the gas company is providing gas without being compensated for same and this is a very important consideration because of the dollar value of the gas. For example, if a well was providing 300,000 cubic feet of gas per day and gas was $5 per 1000 cubic feet and the meter was down for 2 hours then the gas company has lost $125 from just the one well or line. Because of the large quantity of fairly small parts of items which must be handled in the disassembly and assembly of the device, the overall operation is time consuming and therefore expensive. Since the devices are usually located at gas well sites in remote areas and subject to extreme weather conditions, the disassembly and assembly efforts may be extremely difficult, especially when protective clothing needs to be worn.

Also, a ball-disc drive is located in a lower cavity of the prior art device and drives an output shaft. The output shaft is connected to an external recorder, indicator or other readout instrument. If the output shaft is bent during the installation of the external recorder, indicator or other readout device then, of course, the bent shaft must be replaced. In order to replace the bent shaft, the prior art differential pressure-responsive device or meter must be removed from the lines and mounting post and then be disassembled in order to gain the necessary access to the damaged shaft.

A low-pressure relief valve is provided in the prior art device as an integral part of the main pressure body and is located where the valve is exposed to any liquids and dirt which might enter the meter system. The prior art relief valve comprises a number of small parts including a spring with a low value of spring force which allows the valve to be activated by less then 3.66 pounds of differential pressure which results in a tendency for the valve to leak if the pressure on the high side of the valve is no greater than 3.66 psi. Also, dirt and trash in the prior art device could easily come to rest between the valve ball and the valve seat, thereby causing the valve to leak and cause the meter to give an incorrect reading.

SUMMARY OF A PREFERRED EMBODIMENT OF THE INVENTION

The present invention as claimed is intended to provide a remedy for and minimize or reduce the problems of the type previously noted. The present invention accordingly provides a differential pressure-responsive device or meter wherein the bellows and range-spring mechanism together with the low-pressure relief valve may be readily and easily separated from the device without the necessity of removing the device or meter from the high and low pressure connection pipes or lines or the mounting post. By the same token, the present invention provides a differential pressure-responsive device or meter wherein the internal cavities and sections may be checked for trash and may also be cleaned without essentially completely disassembling the device or meter and without the necessity for removing the device or meter from the high and low pressure connection pipes or lines or the mounting post. The present invention provides a differential pressure-responsive device or meter wherein the low-pressure relief valve is not an integral part of the main pressure body and is located where liquids and dirt will not normally be located to thereby cause unreliable seating of the low-pressure relief valve. The present invention provides a differential pressure-responsive device or meter wherein defective parts or elements may be removed and replaced with properly working parts or elements without completely dismanteling the meter installation.

The invention accordingly provides a differential pressure-responsive device or meter wherein a plurality of the major parts or elements of the device are provided as a unit or a module for easy insertion or removal from the device. Included in this unit or module are the bellows, range spring, high pressure relief valve assembly and low pressure relief valve assembly. This bellows and range spring module is configured and positioned such that the module can be removed from and reinserted into the device without completely disassemblying the device or meter and also without dismantling the device or meter from its installation of high and low pressure lines and mounting post. Upon removal of the bellows and range spring module, the device or meter may be cleaned and checked and the output shaft may be removed and replaced without removing the device from its installation. The low pressure relief valve is a pop-type valve which is part of the bellows and range spring module. The low pressure relief valve is now mounted on the top portion of the bellows where liquids and dirt are not normally found and will not now interfere with the seating of the valve. The low pressure relief valve has a spring with a higher value of spring force which results in a more positive sealing function.

Among the advantages offered by the claimed invention is the elimination of the need to remove the differential pressure-responsive device from the high pressure connection pipe, the low pressure connection pipe and the mounting or supporting column when checking and cleaning the internal portions of the device and when repairs are required to the internal parts of the device. Perhaps the most important advantage is the decrease in service time in the field since the need to disassemble and assemble a large number of small parts has been eliminated thereby greatly reducing the down time of the meter or the line. A further advantage is a decrease in assembly time in the factory and the elimination of calibration and adjustments with reference to the valve stem of the high pressure relief valve assembly. Another advantage is the low pressure relief valve which is more positive in its sealing action and the automatic replacement of the valve each time a new bellows and range spring module is inserted in the device. A further advantage is the elimination of the disassembly and assembly of a large quantity of individual parts while servicing the device in the field in extreme weather conditions.

A number of the more important features and advantages of this invention have thus been summarized rather broadly in order that the detailed description thereof that follows may be better understood and in order that the contribution to the art may be better appreciated. There are, of course, additional features of the invention which will be described hereinafter and which will also form the subject of the claims appended hereto. Other features of the present invention will become apparent with reference to the following detailed description of a presently preferred embodiment thereof, for carrying out the invention, in connection with the accompanying drawings, wherein like reference numerals have been applied to like elements, in which:

DETAILED DESCRIPTION OF A PREFERRED EMBODIMENT OF THE INVENTION

Figure 1:
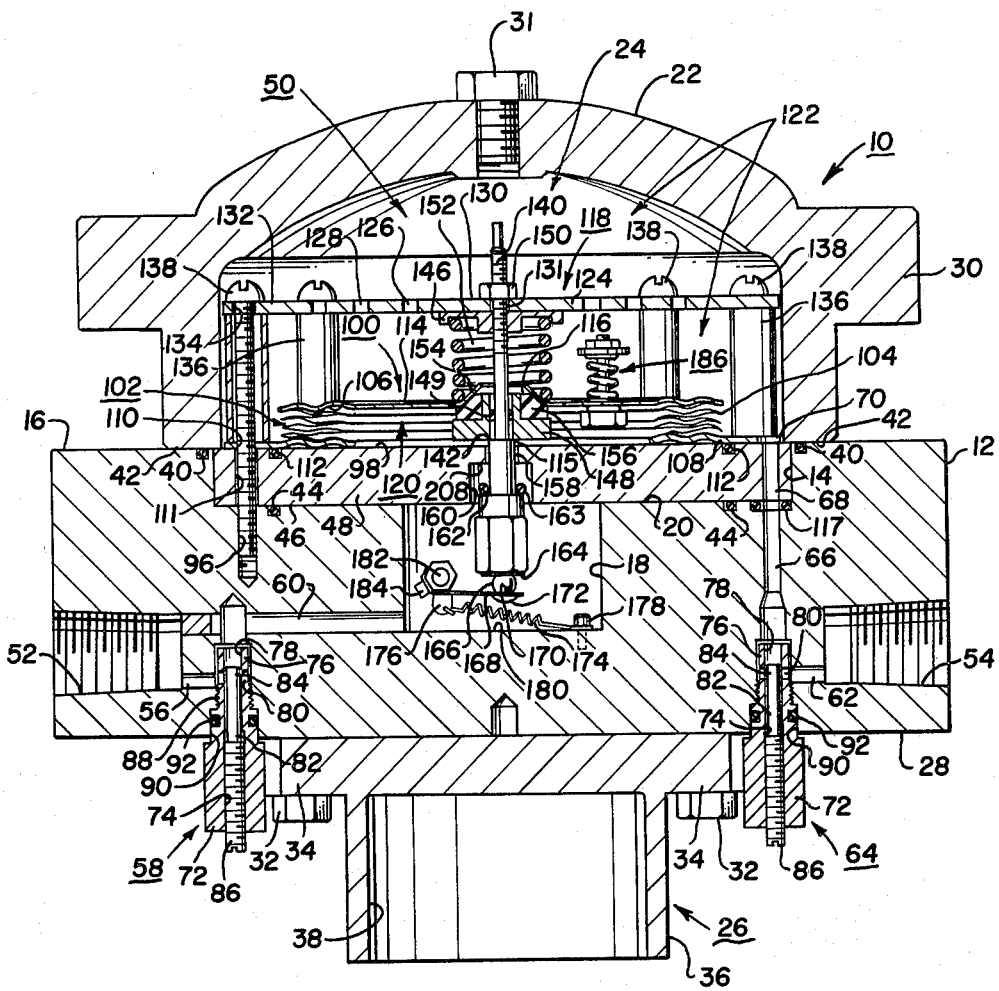
FIG. 1 is a simplified vertical, sectional view of the differential pressure-responsive device embodying the present invention.
Figure 2:
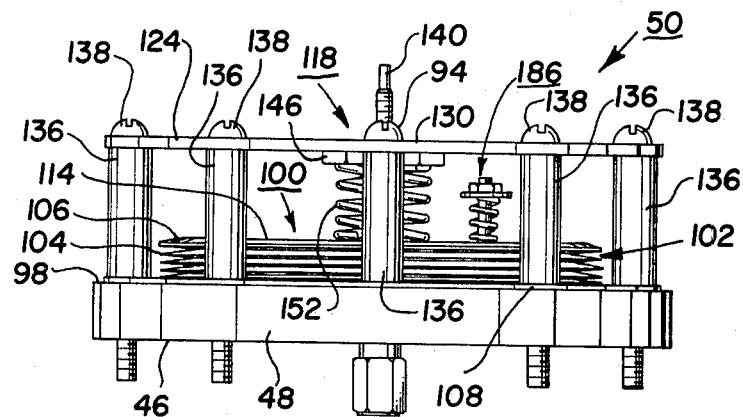
FIG. 2 is a simplified side plan view of the bellows and range spring module of the present invention.

Referring now to the drawing, and in particular to FIGS. 1 and 2, a differential pressure-responsive device or meter according to the present invention is referred to generally by reference numeral 10. The principal housing body components of the differential pressure-responsive device or meter 10 comprises a relatively thick metal, substantially disk-shaped, primary base plate 12 having a central, upwardly-facing cylindrical first cavity or recess 14 formed in the upper surface 16 thereof. In addition, first cavity or recess 14 has a central, upwardly-facing cylindrical second cavity or recess 18 formed in the lower surface or floor 20 of first cavity or recess 14. A dome-shaped cover 22 is sealingly bolted to the upper surface 16 of the primary base plate 12 to form therewith a normally closed head chamber 24. Bolt 31 which is threadably secured in the top portion of cover 22 allows access to chamber 24 for pressure measurements, etc. A supporting or mounting fixture 26 is fastened coaxially to the bottom surface 28 of the primary base plate 12.

The dome-shaped cover 22 is detachably held in place upon the upper surface 16 of the primary base plate 12 by means of a plurality of bolts (not shown) which extend vertically through circumferentially spaced-apart bolt holes (not shown) formed through a radially extending marginal rim portion 30 of the dome-shaped cover 22 and through correspondingly positioned, holes (not shown), provided in the primary base plate 12 and are secured by fasteners on nuts (not shown) threadably attached thereto. The supporting or mounting fixture 26 is similarly attached coaxially to the bottom surface 28 of the primary base plate 12 by means of a plurality of bolts 32 which extend vertically through circumferentially spaced-apart bolt holes (not shown) formed through a radially extending flanged portion 34 of the supporting or mounting fixture 26 and into correspondingly positioned threaded holes (not shown) formed in the lower surface 28 of the primary base plate 12. The supporting or mounting fixture 26 is formed with a coaxial, downwardly directed sleeve portion 36 which provides therein a downwardly facing cylindrical socket 38 for telescopic coupling connection to the upper end of a suitable meter supporting or mounting column member (not shown).

A first O-ring seal 40 is provided between the lower annular edge 42 of the dome-shaped cover 22 and the upper surface 16 of the primary base plate 12. A second O-ring seal 44 is provided between the lower annular edge portion 46 of the secondary base plate 48 of the bellows and range spring module or unit 50 and the lower surface or floor 20 of the first cavity or recess 14.

Entering into the exterior edge portion of the primary base plate 12 is a threaded high pressure line or pipe connector port 52 and a threaded low pressure line or pipe connector port 54. The high pressure connection line or pipe (not shown) from the primary device (orfice plate, venturi, etc.) is attached to pipe connector port 52 while the low pressure connection line or pipe (not shown) from the primary device is attached to pipe connector port 54. The high pressure connector port 52 communicates with the second cavity or recess 18 by way of duct 56, high pressure variable damper mechanism 58 (hereinafter more fully described) and duct 60. The low pressure connector port 54 communicates with the head chamber 24 by way of duct 62, low pressure variable damper mechanism 64 (hereinafter more fully described) duct 66, duct 68 and cutout 70.

Each of the hereinbefore mentioned pressure variable damper mechanisms 58 and 64 comprise a stepped diametered, generally cylindrical insert plug body 72. The insert plug body 72 is formed with a coaxial bore 74 therein with the upper section 76 formed with a reduced tapered bore 78. The coaxial bore 74 is separated from the upper section 76 by a crosswise extending flow connection passage 80. Contained within the coaxial bore 74 and longitudinally reciprocable therein between limits, is a solid cylindrical piston 82. Positioned on the upper end of piston 82 is a solid tapered piston 84 whose tapered surface sealingly engages and mates with tapered bore 78. Positioned on the lower end of piston 82 is a threaded adjustment screw 86 which makes threaded connection with corresponding internally threaded portion of coaxial bore 74. Piston 82 and piston 84 are free to reciprocate axially within the bores 74 and 78 within the axial limits determined by the distance between the surface of the tapered bore 78 and the upper end of adjustment screw 86. Adjustment screw 86 allows the damper mechanisms 58 and 64 to be adjusted whereby the degree of pressure pulsation dampening may be set to a value as required to meet conditions encountered in different installations and whereby the effective dampening action of both damper mechanisms may be equalized. The insert plug body 72 is provided with an externally threaded section 88 which makes readily detachable threaded connection with corresponding internally threaded damper insertion ports 90 which enter the bottom surface 28 of the primary base plate 12. O-ring seals 92 are provided between the insert plug bodies 72 and the unthreaded portion of damper insertion ports 90 to provide a fluid-tight seal between variable damper mechanisms 58 and 64 and primary base plate 12.

Contained within the head chamber 24 is the removably attached bellows and range spring module or unit 50. The major elements of the bellows and range spring module 50 comprises the secondary base plate 48, the bellows assembly 100, the low pressure relief valve assembly 186, the high pressure relief valve assembly 118, the range spring 124, hollow cylindrical stand off members 136, fastening means 94 to attach and hold the above-named elements together as a module or unit and fastening means 138 to attach and hold the bellows and range spring module 50 to the primary base plate 12. When the bellows and range spring module 50 is in operative position in the differential pressure-responsive device or meter 10, the secondary base plate 48 is positioned within first cavity or recess 14. The secondary base plate 48 comprises a relatively thin metal, substantially disk-shaped plate whose thickness substantialy approximates the depth of first cavity or recess 14. Positioned in sealing engagement on the upper or top surface 98 of secondary base plate 48 is the bellows assembly 100. The bellows assembly 100 comprises a hollow, generally cylindrical metal bellows body 102 composed of a plurality of interconnected, vertically superposed annular folds or convolutions 104. Each of the convolutions 104, as viewed in vertical cross-section, is radially curved in an approximately sinusoidal form such that when the bellows body 102 is in the fully collapsed or retracted condition, the adjacent folds or convolutions 104 are nested upon one another in full surface contact such as to present, in effect, a substantially solid, axially and laterally self supporting cylindrical body capable of withstanding external pressures greatly in excess of normal without incurring permanent damage or rupture. The top and bottom ends of the metal bellows body 102 are attached, by suitable means such as by welding or soldering around the periphery, to generally annular shaped top and bottom end fittings 106 and 108, respectively.

The bottom end fitting 108 of the metal bellows assembly 100 is positioned on the upper or top surface 98 of the secondary base plate 48 coaxially therewith and also extends radially outwardly from bellows body 102. Cutout 70 and a plurality of one or more holes or apertures 110 (only one shown) are formed in the extending portion of the bottom end fitting 108. The apertures 110 are formed in a circle coaxial with the bellows assembly 100 and the bottom end fitting is positioned such that apertures 110 are aligned with a like number of corresponding apertures or holes 111 (only one shown) formed in and through the secondary base plate 48 and cutout 70 is aligned with duct 68. In the preferred embodiment, there are eight apertures 110 formed in the extending portion of the bottom end fitting 108. Of the corresponding apertures or holes 111 (only one shown) which are formed in the secondary base plate 48 of the preferred embodiment, six apertures 111 are not internally threaded while two apertures 111 (not shown) on opposite edge portions of secondary base plate 48 are internally threaded. Aperture 115 is formed in the center of bottom end fitting 108. An O-ring seal 112 is provided between the lower annular surface of the bottom end fitting 108 and the upper or top surface 98 of the secondary base plate 48 whereby a fluid-tight seal is provided between the bottom end fitting 108 of the metal bellows assembly 100 and the secondary base plate 48. O-ring seal 117 is provided between the lower annular edge portion 46 of the secondary base plate 48 and the lower surface or floor 20 of the first cavity or recess 14 and surrounds the intersection of duct 68 and cutout 70.

Extending radially inwardly from the radially inner edge of the bellows top end fitting 106, and preferrably formed integrally therewith, is a generally annular-shaped bellows top closure plate 114 having a centrally located valve aperture 116 formed therein, which valve aperture 116 forms a part of a high pressure relief valve assembly 118, hereinafter more fully described. Bellows assembly 100, including the bellows top closure plate 114, when the valve aperture 116 of the high pressure relief valve assembly 118 is closed, as shown in FIG. 1, serves to divide the head chamber 24 into separate, inner and outer, closed chamber portions as indicated at 120 and 122, respectively. Valve assembly 118 provides a normally closed, one-way opening valve means.

Positioned above bellows assembly 100 and located coaxially thereto is the range spring 124. Range spring 124 comprises a generally circular flat spring formed of a relatively thin disk, through the thickness of which has been cut a pair of generally coaxially extending spiral slots 126 and 128, whereby the central portion 130 of the spring 124 is rendered axially, resiliently flexible with respect to the supported circumferential, marginal portion 132 thereof. Aperture 131 is formed in the center of central portion 130. A plurality of holes or apertures 134 are formed in the marginal portion 132 in a circle coaxial with the central portion 130. Holes or apertures 134, 110 and 111 are equal in number and are in alignment with each other. A hollow cylindrical stand-off member 136 is positioned between the lower surface of marginal portion 132 and the upper surface of bottom end fitting 108 for each aligned hole or aperture 134, 110 and 111 and in alignment therewith. Fastening means 94 removably attaches and holds together the elements of the bellows and range spring module 50 so the module 50 may be inserted into and removed from the differential pressure-responsive device or meter 10 as a unit and not as individual parts as was the situation in the prior art. In the preferred embodiment, fastening means 94 comprises two machine screws each of which pass through an aligned aperture 134, stand-off member 136, aperture 110 and are threaded into the two internally threaded apertures 111 (not shown) which are located on opposing edge portions of the secondary base plate 48. Only one fastening means 94 is shown in FIG. 2 with the other fastening means 94 being directly behind the one shown and being on the far or back side of the module 50. Fastening means 138 removable attaches and holds the bellows and range spring module 50, as a one-piece unit, within cavity or recess 14 in the primary base plate 12. In the preferred embodiment, fastening means 138 comprises six machine screws, each one of which passes through an appropriately aligned aperture 134, stand-off member 136, aperture 110, aperture 111 (unthreaded) and is threaded into an internally threaded aperture 96 in the primary base plate 12.

Fixed to the central portion 130 of range spring 124 and vertically movable therewith is a high pressure relief valve assembly 118. The relief valve assembly 118 comprises a coaxially positioned, central valve stem 140 carrying, on its intermediate section and supported upon an upwardly facing annular shoulder 142, a separated two-piece spool-shaped body assembly 144 having axially opposite, upper and lower annular flanges 146 and 148, respectively. The upper threaded end portion of the central valve stem 140, extends through aperture 131 in the central portion 130 of range spring 124 and is provided with a threaded retainer nut 150 by means of which the high pressure relief valve assembly 118 is firmly secured to and depends vertically from the central portion 130 of range spring 124. A helical compression spring 152 extends coaxially of the central valve stem 140 between the lower surface of the upper annular flange 146 and the upper surface of the bellows top closure plate 114, adjacent to and surrounding the upwardly curved margin 154 of the valve aperture 116.

The lower annular flange 148 carries upon its upper surface, an annular valve seal member 156 which, under the bias of the helical compression spring 152, is normally retained in firmly closed position relative to the valve aperture 116. O-ring seal 149 is positioned around valve stem 140 and provides a seal between valve stem 140 and lower annular flange 148.

The lower end portion of the central valve stem 140 extends vertically slidably through apertures 115 and 158 and third cavity or recess 160 into second cavity or recess 18. Third cavity or recess 160 comprises a downwardly-facing, cylindrical cavity formed in the lower surface of the secondary base plate 48. An upwardly facing annular shoulder 162 is provided on the lower portion of the central valve stem 140 and is positioned within third cavity or recess 160. O-ring seal 163 is positioned on shoulder 162. A smooth flat surface 164 is provided on the lower end of central valve stem 140 and is disposed normal to the longitudinal axis of stem 140. A curved surface 166 is provided on the arm 168 adjacent its end portion. In the present preferred embodiment, the surface 166 is hemispheric and is provided by means of a sphere 170 carried in a socket 172 on the end of arm 168. Curved surface 166 is biased upwardly into engagement with flat surface 164 by extension spring 174 which is attached between lever 176 and fastening means 178 which is attached to the floor 180 of second cavity or recess 18. Lever 176 depends from arm 168 with arm 168 being removably attached to output shaft 182 to move therewith by fastening means 184. Output shaft 182 is attached to conventional type recorders and/or associated computational apparatus.

Figure 3:
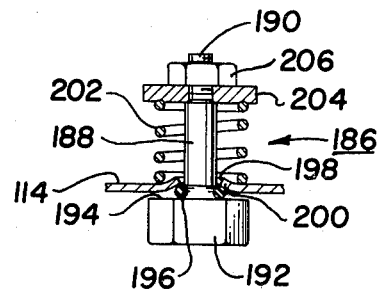
FIG. 3 is a simplified partial cutaway side view of the low pressure relief valve of the present invention.

With reference to FIG. 3, the low pressure relief valve assembly 186 is disclosed as comprising a central valve stem or shaft 188 including an upper threaded end portion 190 and a lower end portion 192 which is larger in diameter than stem 188 and includes an upwardly facing annular shoulder 194. Operatively positioned on shoulder 194 is O-ring 196. Central valve stem or shaft 188 extends upwardly through valve aperture 198 formed in the bellows top closure plate 114 by first drilling a hole of predetermined size in the closure plate 114 and then forming the valve seat 200 by use of a 60 degree forming-tool punch. A helical compression spring 202 extends coaxially of the central valve stem or shaft 188 between the upper surface of the bellows top closure plate 114 and a washer 204 and threaded retainer nut 206 threadably attached to the upper threaded end portion 190 of central valve stem or shaft 188. Compression spring 202 forces O-ring 196 against valve seat 200 to provide the sealing action of the low pressure relief valve assembly 186 and will open with generally 7 pounds of differential pressure between outer chamber portion 122 and inner chamber portion 120. Valve assembly 186 provides a normally closed, one-way opening valve means.

It will be appreciated that there has been provided an invention which allows the differential pressure responsive device or meter 10 to be checked and/or cleaned and/or repaired without the need to remove the meter 10 from the high pressure line, the low pressure line and the supporting column member or without the need to disassemble and reassemble a large number of small parts. With a wrench, the dome-shaped cover 22 may be removed and with a screwdriver, the bellows and range spring module 50 may be removed and replaced with a new unit in a matter of minutes. Upon removal of the bellows and range spring module 50, access may be had to the output shaft 182 and its associated elements or parts. Each time a new bellows and range spring module 50 is placed in the meter 10, a new high pressure relief valve assembly 118 and a new low pressure relief valve assembly 186 are also inserted into the meter 10. The new inventive low pressure relief valve assembly is more accurate and reliable in its operation. The design of the bellows and range spring module 50 allows the machine surfaces of the various elements comprising the module 50 to be controlled to a degree such that there are not any adjustments or calibration required to the module 50, not even to the central valve stem 140 of the high pressure relief valve assembly 118. In the prior art, the travel of the central valve stem 140 must be adjusted after reassembly of the many piece parts of the meter.

In operation, the line or pipe carrying the highest average pressure is connected to pressure line connector port 52 and the line or pipe carrying the lowest average pressure is connected to pressure line connector port 54. The higher pressure is communicated from connector port 52 through duct 56, high pressure variable damper mechanism 58, duct 60, second cavity or recess 18, third cavity or recess 160, aperture 158, aperture 115 and between the top surface of bottom end fitting 108 and the bottom surface of lower annular flange 148 to the inner chamber portion 120. The lower pressure is communicated from connector port 54 through duct 62, low pressure variable damper mechanism 64, duct 66, duct 68 and cutout 70 to the outer chamber portion 122. The higher pressure within the inner chamber portion 120 causes expansion of the bellows assembly 100 and upward movement of the bellows top closure plate 114 relative to the bottom end fitting 108 and the upper or top surface 98 of secondary base plate 48. Upward movement of the bellows top closure plate 114 is transmitted through compression spring 152 to and results in corresponding upward deflection of the central portion 130 of range spring 124 until the opposing downward force of range spring 124 and the upward force, exerted by the bellows assembly 100, reach equilibrium. The initial static compression of compression spring 152 is normally considerably in excess of the compressive force transmitted from the bellows top closure plate 114 to the central portion 130 of range spring 124 such as to maintain the high pressure relief valve assembly 118 in the closed state whereby the central valve stem 140, under such normal conditions, exactly follows the vertical movement of the bellows top closure plate 114. Such vertical movement of the bellows top closure plate 114 is therefore transmitted through the compression spring 152 to the central portion 130 of range spring 124 and thence through the central valve stem 140 to the sphere 170 and arm 168, located at the lower end of stem 140, thereby imparting corresponding rotational displacement or motion to the output shaft 182. Extension spring 174 maintains sphere 170 is contact with the smooth flat surface 164 of central valve stem 140 whereby any lost motion is prevented.

There are protective features of the differential pressure-responsive device or meter 10 such that if excessively high pressure is applied to connector port 52 relative to the pressure applied to connector port 54, that excessively high pressure is conducted, in a manner set forth supra, into inner chamber portion 120 causing the bellows assembly 100 to expand, thereby moving the bellows top closure plate 114 and the high pressure relief valve assembly 118, including central valve stem 140, further upwardly relative to secondary base plate 48. When such resulting upward movement of the bellows top closure plate 114 reaches a predetermined limit, less than that which would result in permanent deformation and damage to the bellows assembly 100 and near the limit of rotational movement desired for output 182, O-ring seal 163 on upwardly facing annular shoulder 162 on central valve stem 140 contacts the bottom surface 208 of third cavity or recess 160 and prevents further upward movement of central valve stem 140 while providing a seal such that any higher pressures are not introduced into inner chamber portion 120. If the pressure within the inner chamber portion 120 should increase further, the bellows top closure plate 114 moves further upwardly thereby increasing the compression of compression spring 152 and opening the high pressure relief valve assembly 118 sufficiently to permit the escape of pressure from within the inner chamber portion 120 through valve aperture 116 to the outer chamber portion 122, sufficient to limit the differential pressure and resultant maximum expansion of the bellows assembly 100.

If excessively high pressure is applied to connector port 54 relative to the pressure applied to connector port 52, that excessively high pressure is conducted, in a manner set forth supra, into outer chamber portion 122 causing the bellows assembly 100 to contract upon itself approaching a fully collapsed condition. As the pressure in outer chamber portion 122 increases such that the differential pressure is approximately 7 pounds, the low pressure relief valve assembly 186 will pop open sufficiently to relieve the excess pressure from the outer chamber portion 122 to the inner chamber portion 120 through valve aperture 198. So the differential pressure-responsive device or meter 10 includes protective devices to prevent damage to the meter 10 by inadvertently applied higher than normal differential pressure to either connecting port.

Thus it is apparent that there has been provided in accordance with this invention, a differential pressure-responsive device that substantially incorporates the advantages set forth above. Although the present invention has been described in conjunction with specific forms thereof, it is evident that many alternatives, modifications, and variations will be apparent to those skilled in the art in light of the foregoing disclosure. Accordingly, this description is to be construed as illustrative only and is for the purpose of teaching those skilled in the art the manner of carrying out the invention. It is understood that the forms of the invention herewith shown and described are to be taken as the presently preferred embodiments. Various changes may be made in the shape, size and arrangement of parts. For example, equivalent elements may be substituted for those illustrated and described herein, parts may be reversed, and certain features of the invention may be utilized independently of the use of other features, all as would be apparent to one skilled in the art after having the benefit of this description of the invention. It will be appreciated that the various modifications, alternatives, variations, etc. may be made without departing from the spirit and scope of the invention as defined in the appended claims.

What is claimed is:

1. A differential pressure-responsive apparatus comprising:
   a primary base plate member;
   a cover member detachably attached to a first surface of said primary base plate and thereby forming a normally closed chamber;
   a first cavity formed in the first surface of said primary base plate within said closed chamber;
   a second cavity formed in the bottom surface of said first cavity;
   a bellows and range spring module operatively positioned in said first cavity and detachably attached to said primary base plate, said module comprising:
   a secondary base plate member;
   a bellows means with one end thereof detachably fixed to a surface of said secondary base plate member and having an opposite normally closed movable end thereof movable between extended and collapsed bellows positions in response to varying differential pressures thereacross, said bellows means dividing said chamber into separate inner and outer chamber portions communicating with the inner and outer sides, respectfully, of said bellows means;
   means to operatively interconnect said inner chamber portion and said second cavity;
   a first normally closed, one-way-opening valve means in said normally closed movable end of said bellows means, operable for interconnecting and disconnecting said inner and outer chamber portions when said first valve means is opened and closed respectfully, said first valve means moving with said movable end of said bellow means when in said closed position, whereby said bellows and range spring module is accessible for removal from said apparatus upon removing only said cover member;
   first and second connector ports formed in said primary base plate member;
   a first duct means in said primary base plate member interconnecting said first port with said outer chamber; and
   a second duct means in said primary base plate member interconnecting said second port with said second cavity, whereby such differential pressures may be applied across said bellows means by way of said first duct means and by way of said second duct means, said second cavity and said interconnecting means.

2. Apparatus according to claim 1, further including:
   motion-transmitting means extending from the interior of said second cavity; and
   means operatively connecting said first valve means to said motion-transmitting means for transmitting, to the exterior of the apparatus, motion bearing a predetermined relation to the travel of said first valve means.

3. Apparatus according to claim 1 or claim 2, further including:
   a second normally closed, one-way-opening valve means in said normally closed movable end of said bellows means, operable for interconnecting and disconnecting said inner and outer chamber portions when said second valve means is opened and closed respectively, said second valve means being opened when the pressure in the outer chamber is a predetermined amount greater than the pressure in the inner chamber.

4. Apparatus according to claim 1, claim 2 or claim 3 further including:
   resilient support means interconnecting said first valve means and said secondary base plate member and guidingly supporting said first valve means for movement thereof relative to said secondary base plate; and
   resilient bias means interconnecting said support means and said first valve means and normally biasing said first valve means toward its normally closed position.

5. Apparatus according to claim 4, wherein said resilient support means comprises:
   a substantially flat, generally disk-shaped, spiral spring body;
   means fixedly supporting the perimetrical portion of said spring body upon and at a fixed distance from said secondary base plate member, substantially coaxially of said bellows means; and
   means fixedly interconnecting said first valve means and the central portion of said spring body.

6. Apparatus according to claim 1 wherein said bellow means comprises a single bellows assembly comprising a plurality of coaxial, annular, end-to-end connected folds, so formed as to nest together upon one another in mutual, uniform contact with one another when said bellows assembly is in fully collapsed condition.

7. Apparatus according to claim 1, further including:
   a pair of fluid pressure pulsation-dampening means in said primary base plate member, one of said dampening means being operatively connected in series with said first duct means in said base plate member and the other of said dampening means being operatively connected in series with said second duct means in said base plate.

8. Apparatus according to claim 5, further including:
   support means removably attached coaxially to a bottom surface of said primary base plate member whereby said apparatus may be supported in operative position.

9. In a differential pressure-responsive apparatus for providing an indication of a differential pressure between known sources, said differential pressure-responsive apparatus including a primary base plate member, comprising:
   a bellows and range spring module detachably attached as a unit to said primary base plate member within a chamber of said differential pressure-responsive apparatus and comprising:
   a secondary base plate member;
   a bellows means with one end thereof removably fixed to a first surface of said secondary base plate member and having an opposite movable end thereof closed by closure means for movement therewith between extended and collapsed bellow positions in response to varying differential pressures introduced across inner and outer sides of said bellows means;
   a first passage extending through said closure means between said inner and outer sides of said bellows means;
   a first, normally closed, one-way-opening valve means operative for opening and closing said first passage, said valve means moving with said closure means while in said closed position;

resilient support means interconnecting said first valve means and said secondary base plate member, guidingly supporting said valve means for said movement thereof relative to said secondary base plate member; and first resilient bias means interconnecting said support means and said closure means and normally biasing said first valve means toward its normally closed position.

10. The apparatus of claim 9, wherein said resilient support means comprises:

a substantially flat, generally disk-shaped, spiral spring body;

means fixedly supporting the perimetrical portion of said spring body upon and at a fixed distance from said base plate member, substantially coaxially of said bellows means; and means fixedly interconnecting said first valve means and the central portion of said spring body.

11. The apparatus of claim 9 or claim 10, further including a second passage extending through said closure means between said inner and outer sides of said bellow means;

a second, normally closed, one-way-opening valve means operative for opening and closing said second passage, said second valve means moving with said closure means while in said closed position; and second resilient bias means interconnecting said closure means and said second valve means and normally biasing said second valve means toward its normally closed position.

12. The apparatus of claim 9, claim 10 or claim 11 further including:

a third passage extending through said base plate member between said first surface and a second and opposite surface and coaxial with said first valve means.

* * * * *

UNITED STATES PATENT AND TRADEMARK OFFICE
CERTIFICATE OF CORRECTION

PATENT NO. : 4,445,382

DATED : May 1, 1984

INVENTOR(S) : LOUIS E. REYNOLDS, ET AL.

It is certified that error appears in the above-identified patent and that said Letters Patent are hereby corrected as shown below:

In Column 2, line 18, "the" (second occurrence) should read ---to---

In Column 2, line 53, "then" should read ---than---

In Column 3, line 11, "for" should read ---of---

In Column 3, line 23, "dismanteling" should read ---dismantling---

In Column 3, line 32, "disassembly-" should read ---disassembl- ---

In Column 7, line 44, "removable" should read ---removeably---

In Column 11, line 25, "fully" should read ---ively---

In Columm 11, line 33, "respectfully" should read ---respectively---

Signed and Sealed this

Twenty-fifth Day of September 1984

[SEAL]

Attest:

GERALD J. MOSSINGHOFF

Attesting Officer

Commissioner of Patents and Trademarks